United States Patent [19]

Schoepf

[11] 4,398,191

[45] Aug. 9, 1983

[54] DOOR INTERLOCK SYSTEM FOR RADIOACTIVE TESTING

[75] Inventor: Victor L. Schoepf, Carrollton, Tex.

[73] Assignee: Mobil Oil Corporation, New York, N.Y.

[21] Appl. No.: 283,247

[22] Filed: Jul. 14, 1981

[51] Int. Cl.³ ........................ G08B 13/08; H04Q 9/00

[52] U.S. Cl. ................................ 340/825.32; 340/542

[58] Field of Search ................. 340/825.5, 542, 825.32

[56] References Cited

U.S. PATENT DOCUMENTS

| | | | |
|---|---|---|---|
| 3,877,266 | 4/1975 | McLaughlin | 340/542 |
| 4,006,471 | 2/1977 | Pappas | 340/542 |

*Primary Examiner*—Donald J. Yusko

*Attorney, Agent, or Firm*—Charles A. Huggett; Michael C. Gilman; Frank J. Kowalski

[57] ABSTRACT

An interlock system is provided wherein access to a test area containing radioactive material is prevented when testing is initiated and generation of harmful rays is prevented when access to the test area is gained during tests.

3 Claims, 2 Drawing Figures

DOOR INTERLOCK SYSTEM FOR RADIOACTIVE TESTING

BACKGROUND OF THE INVENTION

In present laboratory procedures, a laboratory which must have either limited access or totally restricted access is often encountered. One such laboratory is one wherein radioactive testing is performed. One prior art method is to cause an alarm to be sounded whenever access to the testing area is gained. Another method is to lock the area where testing is performed. Both of these prior art methods are subject to human error and may not prove reliable. An alarm which is constantly on may be annoying when an experiment is being set up and access to the area required is on a continual basis. An alarm which is turned on after an experiment is set up can be erroneously left in the off position.

In many states various types of interlock systems are required for laboratories performing tests which utilize radioactive materials. On such state in Texas which under "The Texas Regulations for Control of Radiation" Part 35 entitled "Radiation Safety Requirements for Particle Accelerators" requires six items.

The first requirement takes the general form of requiring an interlock on the door of the testing laboratory.

The second requirement, which is a further delineation of the first, requires that when the laboratory door is opened and closed, continuing operation is to be inhibited until a switch is reset on a remotely located control panel. This requirement is to prevent a person from entering the test area and remaining inside during testing.

The third requirement is for a switch which is located near the door inside the test area. When this switch is on, operation of the neutron generator (cannister) is inhibited until the switch is turned off. This requirement is to prevent a person who is accidentally locked in the test area from being subjected to neutron radiation.

The fourth requirement is to provide a flashing light at the entrance of the testing laboratory to indicate that a test is in progress and the cannister may be generating neutrons.

The fifth requirement is to provide an audible warning device to be activated fifteen seconds prior to the possible creation of neutrons.

Finally, the sixth requirement necessitates that if the power to the neutron generator is turned off at the control panel or the door interlock is interrupted then the interlock system must be rearmed before operation can resume.

These and other requirements are necessary in any doorlock system for neutron testing laboratories and are not available in prior art.

SUMMARY OF THE INVENTION

The present invention pertains to safety devices and more particularly safety devices that are in the form of door interlock systems. A door interlock circuit for a neutron generating test area wherein access to the test area must be blocked and audio and visual alarms energized for a predetermined time period before generation of neutrons is permitted. Neutron generation is automatically prohibited if either access to the test area is gained or a switch within the test area is engaged. The neutron generator is enabled and disabled through a trigger circuit which provides the drive for a high voltage multiplier which supplies the voltage for the target of the neutron tube and provides the drive for the ion circuit which supplies voltage pulses for the neutron tube.

DESCRIPTION OF THE PREFERRED EMBODIMENT

A neutron generating tube (cannister) comprises a high voltage circuit which supplies the necessary high voltage to the target of the neutron tube and an ion circuit having voltage pulses, also necessary for the generation of neutrons at the cannister. Without either of these two elements, neutrons cannot be generated. The drive for both the high voltage multiplier and the ion circuit are supplied by a trigger circuit (see FIG. 2).

Figure 1:
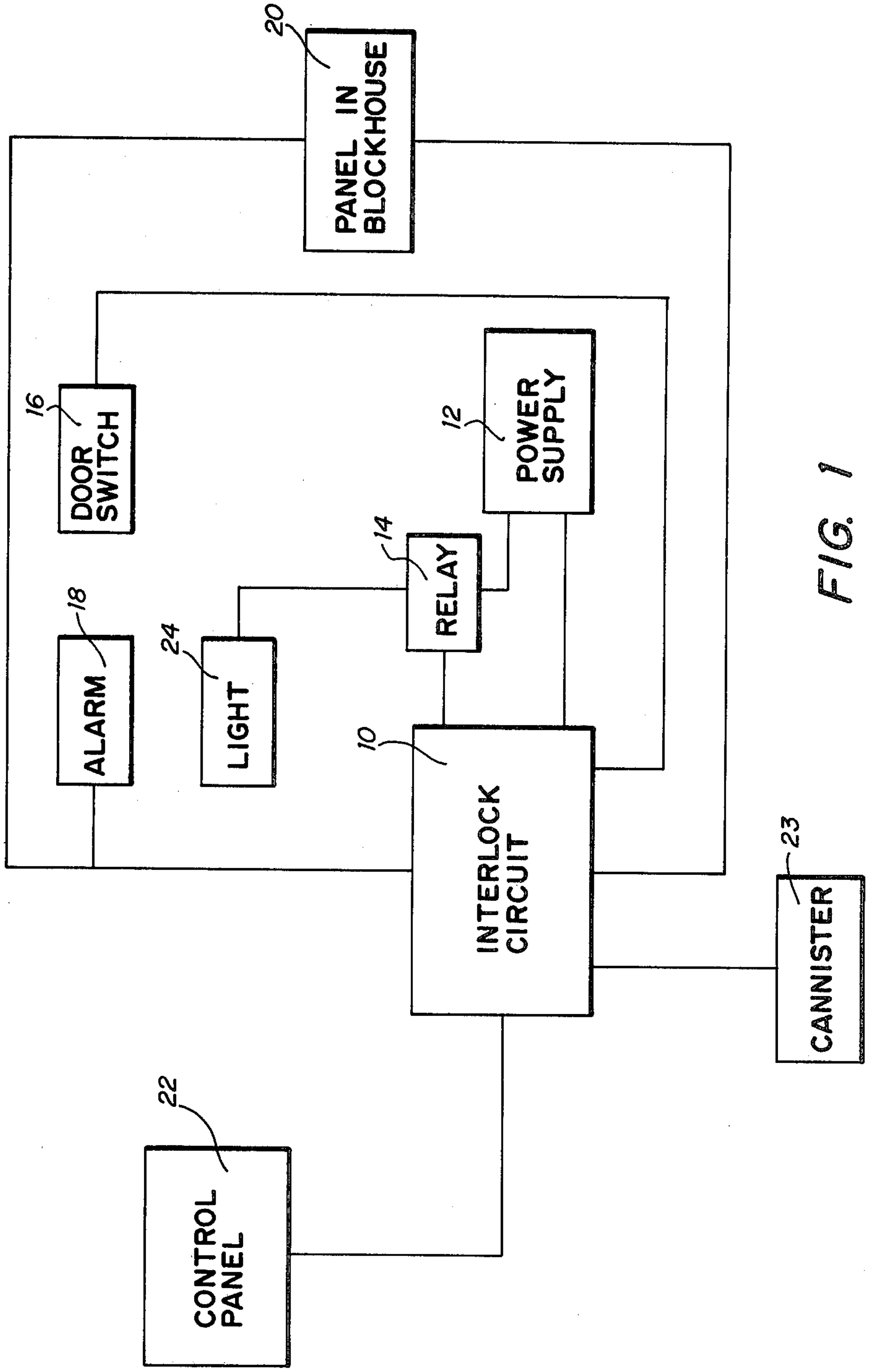
FIG. 1 is a block diagram of the components of a test area.

Referring to FIG. 1, an interlock circuit 10 is illustrated as connected to a power supply 12, relay 14, a door switch 16, an alarm 18, a defeat panel 20, a control panel 22 and cannister 23. Power supply 12 is also connected to relay 14. Relay 14 is also connected to a warning light 24. Panel 20 supplies an input to interlock circuit 10.

Power supply 12 provides the power for interlock circuit 10, warning light 24 and alarm 18. An additional power supply (not shown) supplies the power for the high voltage circuit and the circuit which supplies high voltage pulses for the ion circuit (not shown). The power supply for cannister 23 supplies power from control panel 22 through interlock circuit 10. Interlock circuit 10 determines whether the door to the test area is closed by monitoring door switch 16 and provides power to audible alarm 18 and flashing light 24 for a predetermined time period prior to permitting power to be supplied to cannister 23 from control panel 22. Defeat panel 20, which also contains an audible alarm and light (not shown) energized by interlock circuit 10 contains defeat switch which when activated, disables interlock circuit 10.

Figure 2:
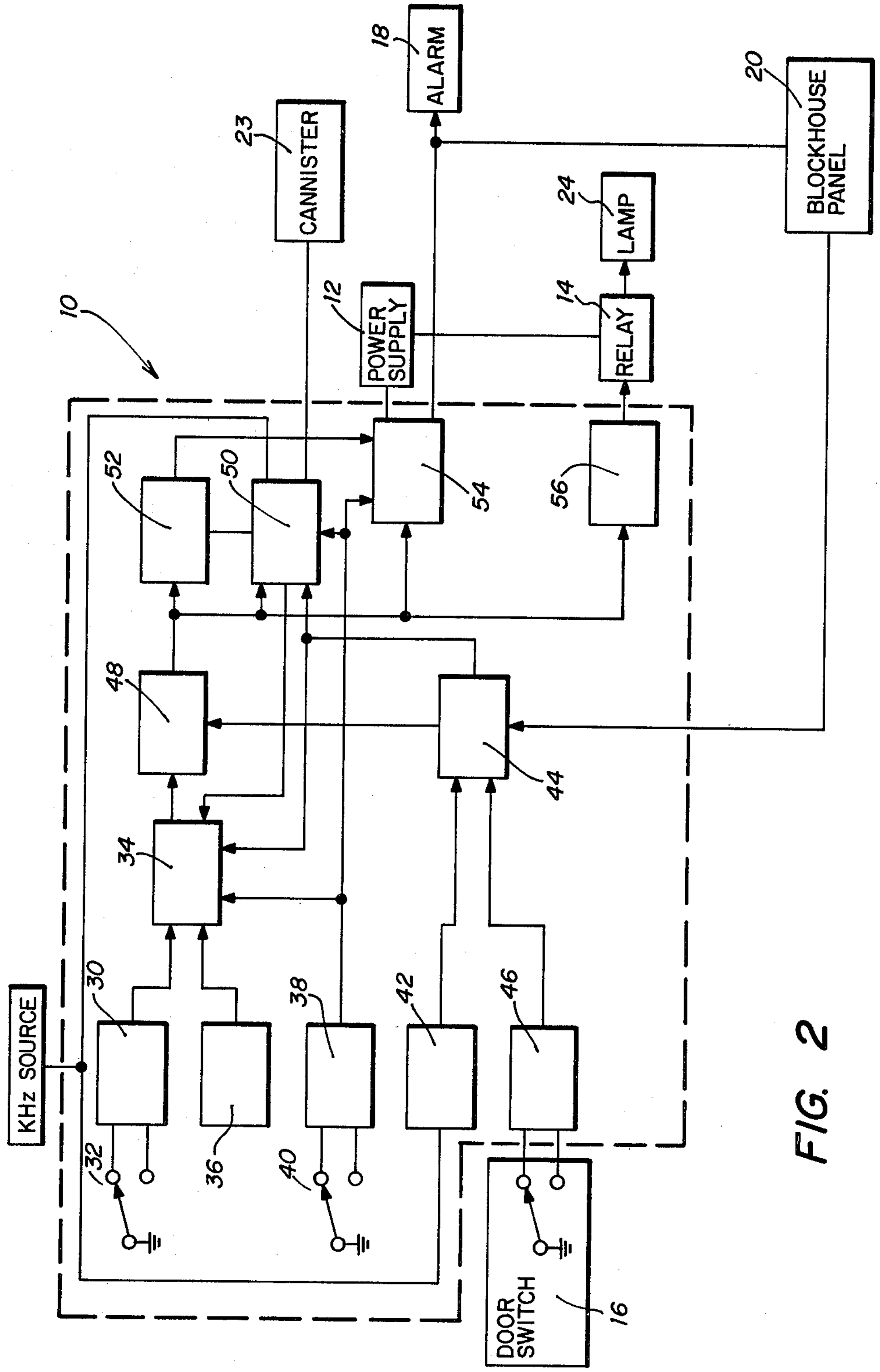
FIG. 2 is a block diagram of the interlock circuit of FIG. 1.

Referring now to FIG. 2, interlock circuit 10 is illustrated in block form with external connections to power supply 12, relay 14, door switch 16, alarm 18, defeat panel 20, control panel 22, cannister 23 and light 24. A logic circuit 30 is illustrated as receiving an input from arm switch 32 and providing an output to flip-flop circuit 34. Oscillator circuit 36 and logic circuit 38 also provide inputs to flip-flop circuit 34. Reset switch 40 is illustrated as providing the input for logic circuit 38. Trigger circuit 42 receives an input from control panel 22 and provides an input for gate circuit 44. Gate circuit 44 also receives inputs from defeat panel 20 and from logic circuit 46 which receives its input from door switch 16. Gate circuit 44 provides inputs to driver circuit 48 into flip-flop circuit 34 and flip-flop circuit 50. Flip-flop circuit 34 also receives an input from flip-flop circuit 50 and provides an output to driver circuit 48. Driver circuit 48 provides an input to flip-flop circuit 50, latching circuit 52, setting circuit 54 and driver circuit 56. Latching circuit 52 supplies an input to setting circuit 54. Flip-flop circuit 50 and setting circuit 54 both receive inputs from logic circuit 38. Flip-flop circuit 50 receives an input from control panel 22 and supplies an output to cannister 23. Setting circuit 54 receives an input from power supply 12 and supplies an output to alarm 18 and to defeat panel 20. Driver circuit 56 supplies an output to relay 14.

Logic circuit 30 is energized when switch 32 is closed or turned on. Logic circuit 30 sets one of the flip-flops in flip-flop circuit 34 which is an initial condition for generating neutrons at cannister 23. Oscillator circuit 36 is the system oscillator and it generates the system clock signal. It runs with preferably a 350 millisecond period. However any suitable period may be used. Logic circuit 38 provides a reset signal from switch 40 to flip-flop circuit 34 and to flip-flop circuit 50 and a cleaning pulse to setting circuit 54 whenever neutron generation at cannister 23 is to be stopped.

Triggfer circuit 42 detects the presence of the electronic pulses necessary to drive the ion circuit of cannister 23 and together with logic circuit 46 provide an enabling input to gate circuit 44. Logic circuit 46 provides a logical true whenever door switch 16 indicates that the door to the test area is closed. Trigger circuit 42 provides a logical true signal whenever electrical pulses are present. Both trigger circuit 42 and logic circuit 46 must provide true inputs before gate circuit 44 is enabled.

Gate circuit 44 also receives an input from defeat panel 20. Defeat panel 20 includes a disabling switch (not shown) which, when activated, disables gate circuit 44 regardless of the inputs from trigger circuit 32 and logic circuit 46. Flip-flop circuit 34 contains two flip-flop circuits, one flip-flop circuit which must be set for generation of neutrons at cannister 23 can take place. A second flip-flop is provided so that steps of closing the test area door as indicated by switch 16, or turning the tool power on, or arming the interlock through arm switch 32 can be performed in any sequence. However it should be noted that all three conditions must be present before generation of neutrons at cannister 23 may commence. Flip-flop circuit 34 sends a signal to driver circuit 48 indicating that all conditions precedent, that is, the test area door is closed, the interlock circuit has been armed, and that defeat switch is defeat panel 20 has not been activated. Driver circuit 48 receives the information that trigger pulses are present, the power has been turned on and that test area door is closed from gate circuit 44 also. Driver circuit 48 must receive the same information 34 before it provides an enabling input to flip-flop circuit 50, latching circuit 52, setting circuit 54 and driver circuit 56. Driver circuit 48 may also be used to activate an indicator such as a light emitting diode indicating that the interlock circuit is activated and neutrons will be generated at cannister 23 when additional circuits have completed their function.

Latching circuit 52 is driven by the signal from driver circuit 48 and will provide a delayed signal to flip-flop circuit 50 and to setting circuit 54. The signal provided by driver circuit 48 energizes setting circuit 54 which energizes audible alarm 18 and an alarm which is included in defeat panel 20. At the end of a predetermined period of time, preferably 15 seconds, the signal from latching circuit 52 times out and setting circuit 54 is deactivated thus turning off alarm 18 and the alarm which is included in defeat panel 20. Approximately simultaneously with the deactivation of setting circuit 54, flip-flop circuit 50 is activated. Flip-flop circuit 50 includes a relay which completes a circuit from the power supply of control panel 22 to cannister 23. Unless flip-flop circuit 50 is enabled by driver circuit 48 and activated by latching circuit 52, no neutrons can be generated by cannister 23. Driver circuit 56 is enabled and activated by driver circuit 48 and provides a signal to relay 14 which completes the circuit between power supply 12 and lamp 24. Whenever the previously discussed start-up conditions are met and an output is provided by driver circuit 48, warning light 24 begins operation. Thus, whenever there is a possibility of neutron generation at cannister 23, warning light 24 will be operating. Warning light 24 may be of any type of visual indicator known in the art. However, a flashing red light is preferred.

Logic circuits 30, 38 and 46 may be of any type of debounce circuit currently known in the art. However, a parallel connected pair of NAND gates each having their output supply one input to the other are preferred. Oscillator circuit 36 is preferably NE556 but may also be any type of oscillator circuit currently known in the art which is suitable. Trigger circuit 42 preferably includes a trigger IC No. 74123 and amplifiers for the input and the output. Flip-flop circuit 34 preferably includes dual flip-flops IC No. 7474. Gate circuit 44 preferably includes an AND gate receiving inputs from trigger circuit 42 and logic circuit 46 along with a dual inverter to eliminate noise in the output signal of the AND gate. The output of the AND gate is preferably fed to driver circuit 48 and fed through a NOR gate which is included as part of gate circuit 44. A second input to the NOR gate is the inverted input from defeat panel 20. The output of the NOR gate provides the setting pulse for flip-flop circuit 34 and flip-flop circuit 50. Driver circuit 48 is preferably an AND gate which receives inputs from flip-flop circuit 34 and gate circuit 44. Latching circuit 52 is preferably a timer circuit such as NE 556 and a one shot trigger circuit such as No. 74123. Flip-flop circuit 50 includes a NAND gate which receives inputs from driver circuit 48 and latching circuit 52 which activates a flip-flop circuit such as No. 7474. Also included in flip-flop circuit 50 are inverters which drive a relay which completes the circuit between the power supply of control panel 22 and cannister 23. A setting circuit 54 preferably includes a flip-flop No. 7474 which receives a clearing pulse from latching circuit 52. The output of the flip-flop circuit is amplified and drives the energization coil of a relay which completes the circuit between power supply 12 and alarm 18. Driver circuit 56 is preferably an oscillator such as NE 556 with a 500 millisecond period to drive warning light 24 and a light on defeat panel 20. The relay is included as part of flip-flop circuit 50 and setting circuit 54 may be of any type relay which satisfies the power requirements. However, Magnicraft W 171 DIP-25 are preferred.

While the present invention has been described by way of preferred embodiment, it is to be understood that the invention is not to be limited thereto but only by the scope of the following claims.

What is claimed is:

1. An interlock system for a test area having an access door, test equipment contained therein, and means for supplying power to the test equipment, said system comprising:

first switch means for connecting the test equipment to the means for supplying power;

indicator means for determining whether the access door is open;

first disabling means responsive to said indicator means for disconnecting the test equipment from the means for supplying power whenever the access door is open or whenever the access door is opened and closed after said first switch means is closed;

alarm means responsive to said first switch means for providing an indication when the means for supplying power is connected to the test equipment;

generator means for supplying activating pulses to the test equipment; and disabling means responsive to said generator means for disconnecting the means for supplying power from the test equipment whenever said activating pulses are absent.

2. The interlock system according to claim 1 also including reset means for reinitiating said generating means.

3. The interlock system according to claim 1 also including second switch means having a normally closed position wherein said generator means is enabled and an open position wherein said generator means is disabled.

* * * * *